(12) United States Patent
Rhee et al.

(10) Patent No.: US 11,347,973 B2
(45) Date of Patent: May 31, 2022

(54) GENERATIVE MODEL TRAINING AND IMAGE GENERATION APPARATUS AND METHOD

(71) Applicant: SAMSUNG ELECTRONICS CO., LTD., Suwon-si (KR)

(72) Inventors: Seon Min Rhee, Seoul (KR); Minsu Ko, Suwon-si (KR); Jihye Kim, Anyang-si (KR); Byung In Yoo, Seoul (KR); Chang Kyu Choi, Seongnam-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 212 days.

(21) Appl. No.: 16/595,774

(22) Filed: Oct. 8, 2019

(65) Prior Publication Data
US 2020/0134383 A1  Apr. 30, 2020

(30) Foreign Application Priority Data

Oct. 29, 2018 (KR) .................. 10-2018-0129653

(51) Int. Cl.
| | |
|---|---|
| *G06T 15/00* | (2011.01) |
| *G06K 9/36* | (2006.01) |
| *G06K 9/62* | (2022.01) |
| *G06N 20/00* | (2019.01) |
| *G06F 21/32* | (2013.01) |
| *G06V 40/50* | (2022.01) |
| *G06V 40/16* | (2022.01) |

(52) U.S. Cl.
CPC .......... *G06K 9/6262* (2013.01); *G06F 21/32* (2013.01); *G06N 20/00* (2019.01); *G06V 40/172* (2022.01); *G06V 40/50* (2022.01)

(58) Field of Classification Search
CPC ......... G06T 7/557–596; G06T 2200/04; G06T 2207/10016; G06T 2207/10021; G06T 2207/10024; G06T 2207/20081; G06T 2207/20084; G06N 20/00–20; G06N 3/02–105; G06K 9/6262–6265; G06K 9/00221–00328; G06V 40/172–173; G06V 40/16–179
See application file for complete search history.

(56) References Cited

U.S. PATENT DOCUMENTS 6,556,196 B1   4/2003 Blanz et al.

OTHER PUBLICATIONS

Liu, "Self-supervised Learning for Dense Depth Estimation in Monocular Endoscopy", Springer, International Workshop on Computer-Assisted and Robotic Endoscopy, Oct. 2, 2018, bib sheet and pp. 1-11. (Year: 2018).*

(Continued)

*Primary Examiner* — Brian Werner
(74) *Attorney, Agent, or Firm* — NSIP Law

(57) ABSTRACT

An apparatus for training an image generative model and an image generating apparatus are provided. The apparatus generates output images from a plurality of input images based on the generative model, extracts depth features from the respective output images based on a depth classification model, calculates a depth loss from the extracted depth features, and trains the generative model based on an overall loss that includes the calculated depth loss.

11 Claims, 11 Drawing Sheets

(56) References Cited

OTHER PUBLICATIONS

Kumar et al., "Monocular Depth Prediction Using Generative Adversarial Networks", CVPR, Jun. 18-22, 2018, Salt Lake City, CVF, 3 bib sheets, and pp. 413-421. (Year: 2018).*
Zhang, Jichao, et al., "ST-GAN: Unsupervised Facial Image Semantic Transformation Using Generative Adversarial Networks", *Proceedings of Machine Learning Research*, 2017, pp. 248-263.
Zhang, Teng, et al., "TV-GAN: Generative Adversarial Network Based Thermal to Visible Face Recognition", Dec. 2017, pp. 1-9.
Zhu, Jun-Yan, et al., "Unpaired Image-to-Image Translation using Cycle-Consistent Adversarial Networks", Nov. 2018, pp. 1-18.
Isola, Phillip, et al., "Image-to-Image Translation with Conditional Adversarial Networks", Nov. 2018, pp. 1-17.
Paysan, Pascal, et al., "A 3D Face Model for Pose and Illumination Invariant Face Recognition", pp. 1-6.
Choi, Yumjey, et al., "StarGAN: Unified Generative Adversarial Networks for Multi-Domain Image-to-Image Translation", *Hong Kong University of Science & Technology*, pp. 1-9.
Liu, Ming-Yu, et al., "Unsupervised Image-to-Image Translation Networks", Feb. 2018, pp. 1-11.

* cited by examiner

GENERATIVE MODEL TRAINING AND IMAGE GENERATION APPARATUS AND METHOD

CROSS-REFERENCE TO RELATED APPLICATIONS

This application claims the benefit under 35 USC § 119(a) of Korean Patent Application No. 10-2018-0129653 filed on Oct. 29, 2018 in the Korean Intellectual Property Office, the entire disclosure of which is incorporated herein by reference for all purposes.

BACKGROUND

1. Field

The following description relates to generative model training and an image generation apparatus and method.

2. Description of Related Art

Technological automation of speech recognition has been implemented through processor implemented neural network models, as specialized computational architectures, that after substantial training may provide computationally intuitive mappings between input patterns and output patterns. The trained capability of generating such mappings may be referred to as a learning capability of the neural network. Further, because of the specialized training, such specially trained neural network may thereby have a generalization capability of generating a relatively accurate output with respect to an input pattern that the neural network may not have been trained for, for example. However, because such operations are performed through such specialized computation architectures, and in different automated manners than they would have been performed in non-computer implemented or non-automated approaches, they also invite problems or drawbacks that only occur because of the automated and specialized computational architecture manner that they are implement

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a method of training a generative model includes generating output images from a plurality of input images based on the generative model, extracting depth features from the respective output images based on a depth classification model, calculating a depth loss from the extracted depth features, and training the generative model based on an overall loss that includes the calculated depth loss.

The training of the generative model may include updating a parameter of the generative model to minimize the calculated depth loss.

The calculating of the depth loss may include calculating a reconstruction loss between an output image generated from each of the plurality of input images and a reference image mapped to a corresponding input image, with respect to the output image, and the training of the generative model comprises training the generative model based on a loss calculated from the depth loss and the reconstruction loss.

The calculating of the reconstruction loss may include calculating the reconstruction loss based on a pixel error between the output image generated from each of the plurality of input images and the reference image.

The calculating of the reconstruction loss may include calculating the reconstruction loss based on an error between a normal vector of each point in the output image generated from each of the plurality of input images and a normal vector of a corresponding point in the reference image.

The method may further include calculating authenticity information from the input images, the output images, and reference images based on a discriminative model, wherein the calculating of the depth loss may include calculating an authenticity loss based on the authenticity information and a reference value, and the training of the generative model may include training any one or any combination of the generative model and the discriminative model based on the authenticity loss.

The training of the generative model may include training the discriminative model while maintaining a parameter of the generative model.

The training of the generative model may include training the generative model while maintaining a parameter of the discriminative model.

The generating of the output images may include acquiring color images as the input images and generating depth images as the output images.

The calculating of the depth loss may include calculating the depth loss based on a similarity between at least two of depth features of reference images and depth features of the output images.

In a general aspect, a method of generating an image includes obtaining a parameter to output a depth image in which a sameness of an object is preserved, with respect to an image generative model, and generating a respective depth image corresponding to each two-dimensional (2D) image from a plurality of 2D images based on the image generative model to which the parameter is applied.

The generating of the depth image may include generating a depth image that includes an object with an identity that is the same as an identity of an object included in each 2D image, based on the image generative model.

The generating of the depth image may include acquiring a 2D image with an image sensor, and generating the depth image corresponding to the 2D image in response to acquisition of the 2D image, wherein the method may further include authenticating a user captured in the 2D image by determining whether the user is an enrolled user based on the depth image.

The generating of the depth image may include selecting at least two 2D images from a plurality of image frames, in response to acquisition of the plurality of image frames, and generating depth images respectively corresponding to the selected at least two 2D images.

The method may further include authenticating a potential user based on a recognition result and a result of matching an enrolled user stored in an enrollment database and the respective depth image.

The method may further include unlocking a device in response to an authentication process with respect to the potential user being successful.

The unlocking of the device may include allowing an access to at least a portion of applications stored in the device based on a determination that an authority set for the enrolled user is determined to match the potential user.

The generating of the respective depth image may include acquiring any one or any combination of an infrared image and a color image as the 2D images with an image sensor.

In a general aspect, an apparatus for generating an image includes a memory configured to store an image generative model, and a processor configured to acquire a parameter to output a depth image in which a sameness of an object is preserved, with respect to the image generative model, and generate a respective depth image corresponding to each two-dimensional (2D) image from a plurality of 2D images based on the image generative model to which the parameter is applied.

Other features and aspects will be apparent from the following detailed description, the drawings, and the claims.

Figure 1:
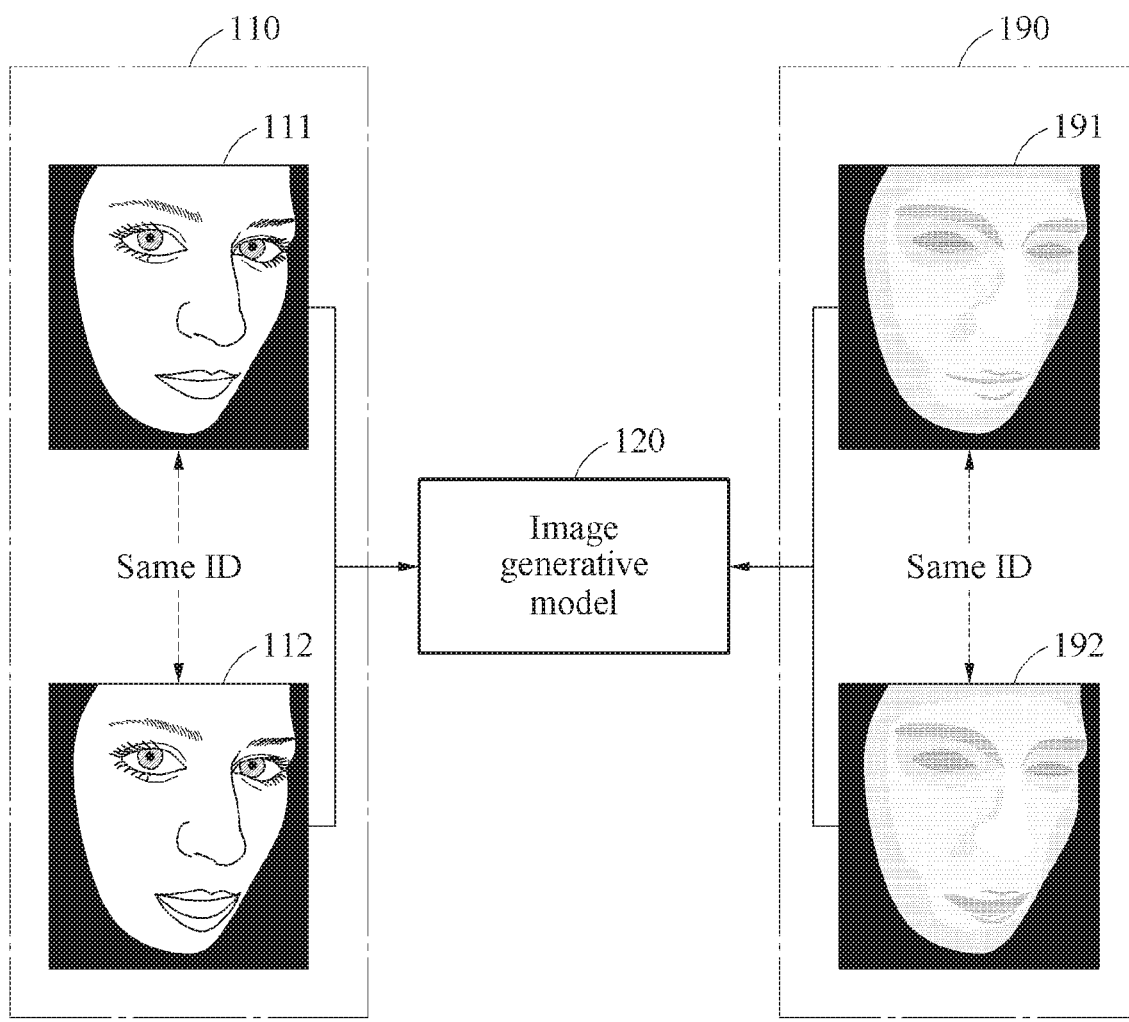
FIG. 1 illustrates an example of an image generative model in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing particular examples only, and is not to be limiting of the examples. The articles "a", "an", and "the" are intended to include the plural forms as well, unless the context clearly indicates otherwise. It will be further understood that the terms "comprises/comprising" and/or "includes/including" and "has" when used herein, specify the presence of stated features, numbers, integers, steps, operations, elements, and/or components, but do not preclude the presence or addition of one or more other features, integers, steps, operations, members, elements, components and/or groups thereof.

Unless otherwise defined, all terms including technical and scientific terms used herein have the same meaning as commonly understood by one of ordinary skill in the art to which this disclosure pertains after an understanding of the present disclosure. It will be further understood that terms, such as those defined in commonly-used dictionaries, should be interpreted as having a meaning that is consistent with their meaning in the context of the relevant art and the present disclosure, and will not be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

FIG. 1 illustrates an example of an image generative model.

Referring to FIG. 1, an image generating system generates output images 190 from a plurality of input images 110 based on an image generative model 120. The image generating system may obtain an input dataset including images of objects of the same type, or images of identical objects. The image generating system may generate the output images 190 from the input images 110 with respect to identical objects. The generated output images 190 may indicate the same identical objects. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The image generative model 120 may be a model configured to generate the output images 190 from the plurality of input images 110. The image generative model 120 may be, for example, a machine learning structure. An example of the structure of the image generative model 120 will be described with reference to FIG. 2.

Referring to the example of FIG. 1, two input images 110, a first input image 111 and a second input image 112, may be obtained from the input dataset. The first input image 111 and the second input image 112 indicate the identity of the same object. The image generating system may input the first input image 111 and the second input image 112 together into the image generative model 120. The image generating system generates a first output image 191 and a second output image 192 based on the image generative model 120. The generated first output image 191 and the generated second output image 192 indicate objects of the same identity. The image generative model 120 is trained to preserve the same identity between the output images 190.

For reference, FIG. 1 illustrates only the first input image 111, the second input image 112, the first output image 191, and the second output image 192. However, examples are not limited thereto. The image generating system may input "n" input images into an image generative model, and may generate "n" corresponding output images from the image generative model. In an example, "n" is an integer greater than or equal to "2". When an input dataset includes "m" images of objects of the same identity, the image generating system may select "n" images from the "m" images and input the selected "n" images into the image generative model 120. Here, "m" is an integer greater than or equal to "n".

Here, an input image and an output image may be images of different formats. A pixel value of the input image and a pixel value of the output image indicate intensity values with respect to different types of signals. The input image may be a color image, and a pixel value of the color image indicates intensity values of red light, green light, and blue light. The output image may be a depth image, and a pixel value of the depth image indicates an intensity value corresponding to a distance, for example, a depth, to a target point corresponding to the pixel.

Herein, a generative model is a model which generates an image of a second format from an image of a first format. The first format is also referred to as an input format, and the second format is also referred to as an output format. Hereinafter, examples are described principally based on a case in which the image of the first format is a color image and the image of the second format is a depth image. However, the examples are not limited thereto. Formats of images include a color image, a depth image, a thermal image, and an infrared image. The generative model is a model which generates an image of another format from an image of one of a plurality of formats.

Thus, the image generating system generates an image set of a second format, which is different from a first format, from an image set of the first format, based on the image generative model 120. The image generating system generates output images such that output images 190 included in the newly generated image set of the second format indicate objects of the same identity.

Hereinafter, an operation of training the image generative model 120 and a related configuration will be described below with reference to FIGS. 2 through 10.

Figure 2:
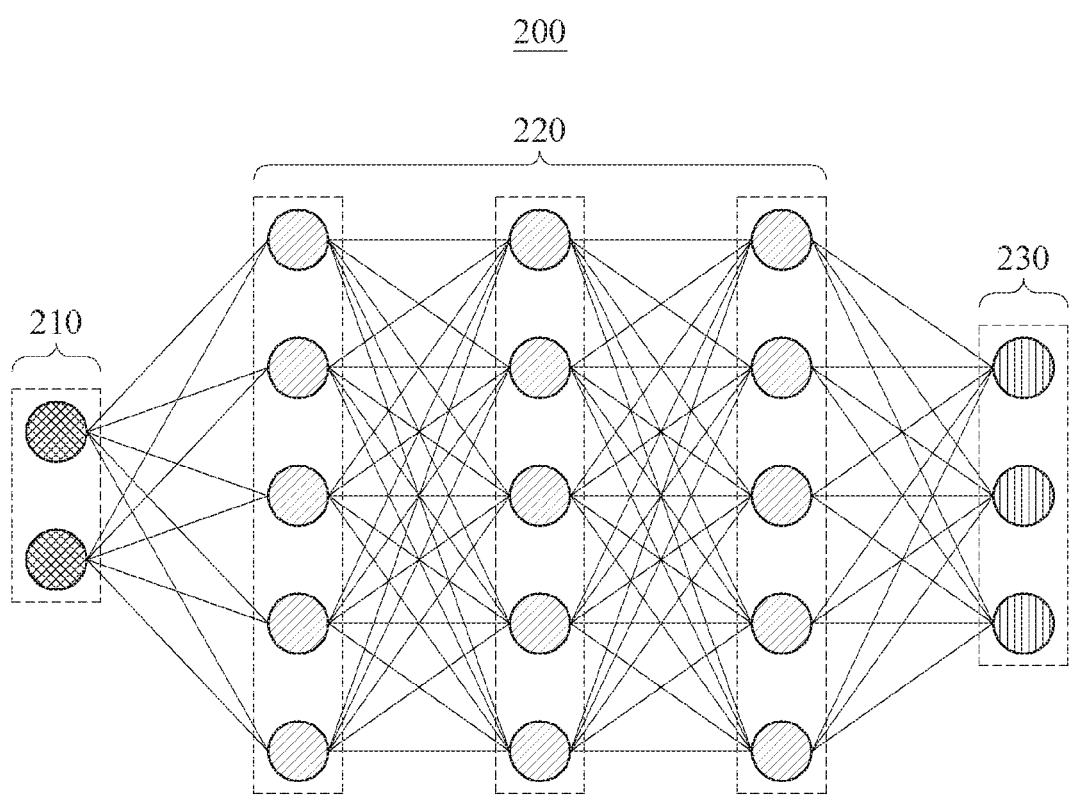
FIG. 2 illustrates an example of a structure of a model in accordance with one or more embodiments.

FIG. 2 illustrates an example of a structure of a model.

Referring to FIG. 2, a neural network 200 may correspond to a deep neural network (DNN), as a non-limiting example. In such an example, the DNN may include a fully connected network, a deep convolutional network, and a recurrent neural network, a recurrent deep neural network (RDNN), and/or a bidirectional recurrent neural network (BDRNN) may include different or overlapping neural network portions respectively with such full, convolutional, recurrent connections, and/or bidirectional recurrent connections. The neural network 200 may perform object classification, object recognition, speech recognition, and image recognition by mapping input data and output data having a non-linear relationship to each other based on deep learning. Deep learning is a machine learning technique to solve a problem such as image or speech recognition from a big dataset. The mapping of the input data and the output data is performed through supervised or unsupervised learning of deep learning.

The neural network 200 may be a processor implemented neural network model, and various processes may be implemented through the neural network models as specialized computational architectures, which after substantial training may provide computationally intuitive mappings between input patterns and output patterns or pattern recognitions of input patterns, as non-limiting examples. The trained capability of generating such mappings or performing such example pattern recognitions may be referred to as a learning capability of the neural network. Such trained capabilities may also enable the specialized computational architecture to classify such an input pattern, or portion of the input pattern, as a member that belongs to one or more predetermined groups. Further, because of the specialized training, such specially trained neural network may thereby have a generalization capability of generating a relatively accurate or reliable output with respect to an input pattern that the neural network may not have been trained for, for example.

Herein, recognition may include verification and identification. Verification is an operation of determining whether input data is true or false, and identification is an operation of determining a label indicated by input data, among a plurality of labels.

Referring to FIG. 2, the neural network 200 includes an input layer 210, a hidden layer 220, and an output layer 230. The input layer 210 and the output layer 230 may respectively include one or more nodes, and the hidden layers 220 may include a plurality of artificial nodes.

For ease of description, FIG. 2 illustrates, for example, three hidden layers 220. However, the hidden layer 220 may include one or more hidden layers. Further, FIG. 2 illustrates the neural network 200 including a separate input layer to receive input data. However, the input data may be input directly into the hidden layer 220. In differing examples, data may input to the input layer 210 in various forms, and in various dimensional forms, input to respective nodes of the input layer of the neural network 200. In the neural network 200, nodes of layers excluding the output layer 230 are connected to nodes of a subsequent layer through links to transmit output signals. The number of links may correspond to the number of nodes included in the subsequent layer. For example, in adjacent fully connected layers, each node of a current layer may have a respective link to each node of the subsequent layer, noting that in some examples such full connections may later be pruned or minimized during training or optimization. Such links are also referred to as connections or connection weights. Such links may also be casually referred to as synapses or synaptic weights though such references are not intended to impart any relatedness with respect to how the neural network architecture computationally maps or thereby intuitively recognizes information and how a human's synapses operate, i.e., the term synapse or synaptic weight is merely a term of art referring to the hardware implemented connections or the corresponding 'connection weights' provided by those connections of a neural network. During training and implementation such connections and connection weights may be selectively implemented, removed, and varied to generate or obtain a resultant neural network that is thereby trained and that may be correspondingly implemented for the trained objective, such as for any of the above example recognition objectives.

An output of an activation function related to weighted inputs of nodes included in a previous layer is input into each node of the hidden layer 220. The weighted inputs are obtained by multiplying inputs of the nodes included in the previous layer by a synaptic weight. The synaptic weight is referred to as a parameter of the neural network 200. An activation function may be any of, for example, a sigmoid, a hyperbolic tangent (tanh), and a rectified linear unit (ReLU), as non-limiting examples. Such activation functions are used to form or impart a nonlinearity of/to the neural network 200. There may be different activation functions used in different layers, such as where the activation functions may be varied during optimization, resulting in different activation functions for different layers. As a non-limiting example, the same activation function may be respectively implemented by all nodes of a particular layer, or for all nodes of the hidden layers, as non-limiting examples. The weighted inputs of the nodes included in the final hidden layer are thus output to, or input into, the nodes of the output layer 230. As another example, the nodes (i.e., output nodes) of the output layer 230 may also implement respective activation functions, such as a SoftMax max function, noting that alternative examples are available and that depending on the trained objective of the output nodes of the neural network 200 the nodes of the output layer 230 may have different activation functions, e.g., to output different types of classification or pattern recognition information.

The neural network 200 may calculate function values based on the number of classes to be classified and recognized by the output layer 230 through the hidden layer 220 when input data is provided, and classifies and recognizes the input data as a class having a greatest value among the function values. The neural network 200 classifies or recognizes the input data. However, for ease of description, a classification and recognition process of the neural network 200 will be described as a recognition process. The following description related to the recognition process may also apply to a classification process.

When the width and the depth of the neural network 200 are sufficiently great, the neural network 200 may have a capacity sufficient to implement a predetermined function. When the neural network 200 learns a sufficient quantity of training data through an appropriate training process, the neural network 200 may achieve an optimal recognition performance.

Herein, an image generative model, hereinafter, a generative model, is a machine learning structure trained to generate an output image from an input image. A depth classification model is a machine learning structure trained to calculate a depth feature from the output image. A discriminative model is a machine learning structure trained to generate information regarding whether the output image is authentic. The generative model, the depth classification model, and the discriminative model described above may be configured with the neural network 200 described above. However, examples are not limited thereto. An apparatus for training a generative model may train the generative model with the depth classification model and the discriminative model. An image generating apparatus generates a new image from an image of an existing database using the trained generative model. The image generating apparatus may generate a depth image from a color image. The generated new image may be in a format different from the format of an existing image, and may be used to establish a training database with respect to the corresponding format.

Figure 3:
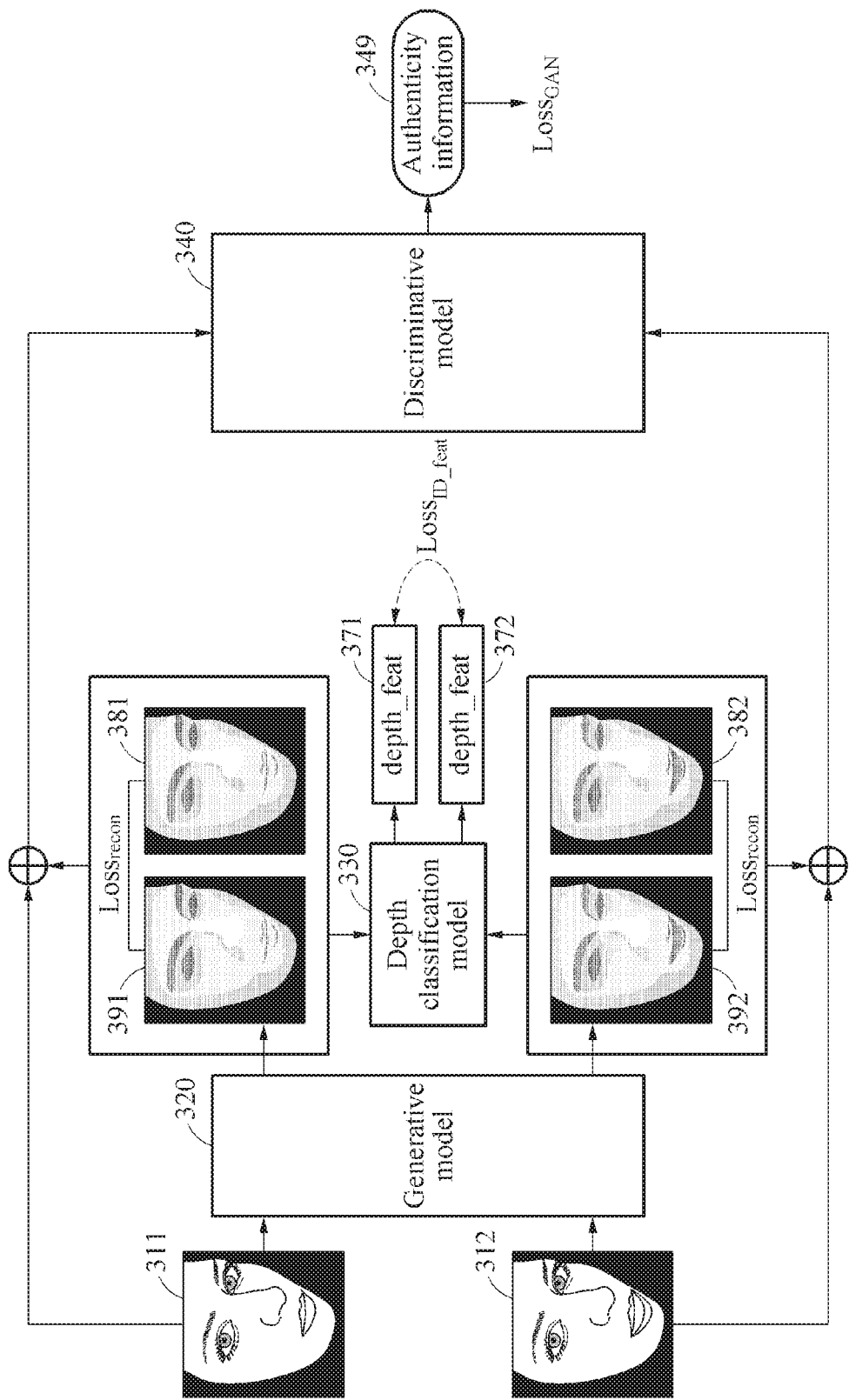
FIG. 3 illustrates an example of a structure for training a generative model in accordance with one or more embodiments.

FIG. 3 illustrates an example of a structure for training a generative model.

Referring to FIG. 3, a structure for training a generative model, hereinafter, a training network structure, includes a generative model 320 and a depth classification model 330. In the training network structure, an output layer of the generative model 320 is connected to an input layer of the depth classification model 330.

An apparatus that trains a generative model, hereinafter, a training apparatus, generates output images from a plurality of input images based on the generative model 320. As shown in FIG. 3, the training apparatus generates a first output image 391 and a second output image 392 from a respective first input image 311 and a respective second input image 312 based on the generative model 320. In an example, since training of the generative model 320 is yet to be completed, the first output image 391 and the second output image 392 are temporary outputs. An example of generating the output images by the generative model 320 will be described below with reference to FIG. 4.

The training apparatus inputs the generated output images 391 and 392 into the depth classification model 330. The training apparatus inputs the first output image 391 and the second output image 392 into the depth classification model 330. The training apparatus extracts depth features respectively from the output images 391 and 392 based on the depth classification model 330. The training apparatus extracts a first depth feature 371 from the first output image 391 based on the depth classification model 330. The training apparatus extracts a second depth feature 372 from the second output image 392 based on the depth classification model 330. An example of calculating the depth features will be described below with reference to FIG. 5.

The training apparatus calculates a depth loss $Loss_{ID\_feat}$ from the extracted depth features. The training apparatus calculates a depth loss $Loss_{ID\_feat}$ between the first depth feature 371 and the second depth feature 372. The depth loss $Loss_{ID\_feat}$ is expressed as a similarity between a feature vector corresponding to the first depth feature 371 and a feature vector corresponding to the second depth feature 372. An example of calculating the depth loss $Loss_{ID\_feat}$ will be described below with reference to FIG. 5.

The training apparatus trains the generative model 320 based on an overall loss including the calculated depth loss $Loss_{ID\_feat}$. Thus, the training apparatus trains the generative model 320 according to the depth loss $Loss_{ID\_feat}$ calculated based on a similarity between depth features extracted with respect to newly generated output images. Through training based on such a depth loss $Loss_{ID\_feat}$, the similarity of the identity between the output images generated through the generative model 320 is preserved.

In addition, the training apparatus calculates the overall loss based on the depth loss $Loss_{ID\_feat}$ and an additional loss, thereby more effectively training the generative model 320.

For example, a reconstruction loss $Loss_{recon}$ may be used as the additional loss. The reconstruction loss $Loss_{recon}$ indicates an error between an output image generated from an input image by the generative model 320 and a reference image with respect to the input image. The reference image is a ground truth image provided with respect to the input image. The input image is an image of a first format, and the reference image is an image of a second format.

The training apparatus calculates the reconstruction loss $Loss_{recon}$ between the output image and the reference image mapped to the input image, with respect to the output images generated respectively from the plurality of input images. The training apparatus calculates a reconstruction loss $Loss_{recon}$ between the first output image 391 and a first reference image 381. The first reference image 381 is a target image mapped to the first input image 311. The training apparatus calculates a reconstruction loss $Loss_{recon}$ between the second output image 392 and a second reference image 382. The second reference image 382 is a target image mapped to the second input image 312. An example of calculating the reconstruction loss $Loss_{recon}$ will be described with reference to FIGS. 6 and 7. The training apparatus trains the generative model 320 based on a loss calculated from the depth loss $Loss_{ID\_feat}$ and the reconstruction loss $Loss_{recon}$. Through training based on such a reconstruction loss $Loss_{recon}$, the training apparatus more effectively trains the generative model 320 with generic shapes of objects.

In another example, an authenticity loss $Loss_{GAN}$ may be used as the additional loss. The authenticity loss $Loss_{GAN}$ may indicate an error between authenticity information 349 generated from a discriminative model 340 and a reference value. The authenticity information 349 includes information indicating a probability that an object shown in a predetermined output image is real. The reference value is a ground truth value provided with respect to a pair of an input image and a reference image and a pair of an output image and a reference image.

The training network structure further includes the discriminative model 340. The discriminative model 340 is connected to an output layer of the generative model 320 to receive the output image and to receive the input image and the reference image. The training apparatus calculates the authenticity information 349 with respect to reference images and output images from input images, the output images, and the reference images based on the discriminative model 340. The training apparatus calculates an authenticity loss $Loss_{GAN}$ based on the authenticity information 349 and the reference value. An example of calculating the authenticity information 349 and the authenticity loss $Loss_{GAN}$ based on the discriminative model 340 will be described below with reference to FIG. 8.

The training apparatus may train any one or any combination of the generative model 320 and the discriminative model 340 based on the authenticity loss $Loss_{GAN}$. The training apparatus fixes a parameter of the generative model 320, and updates a parameter of the discriminative model 340. In another example, the training apparatus fixes the parameter of the discriminative model 340, and updates the parameter of the generative model 320. Through training based on such an authenticity loss $Loss_{GAN}$, the training apparatus effectively trains the generative model 320 to generate more realistic output images.

The training apparatus trains the generative model 320 based on an overall loss into which the losses described above are integrated. The training apparatus updates the parameter of the generative model 320 so as to minimize the overall loss calculated based on the depth loss $Loss_{ID\_feat}$, the reconstruction loss $Loss_{recon}$, and the authenticity loss $Loss_{GAN}$. The training apparatus updates the parameter of the generative model 320 until the overall loss converges.

Further, a model trained in advance is used as the depth classification model 330. However, examples are not limited thereto. The training apparatus trains the depth classification model 330 while training the generative model 320. Furthermore, the training apparatus trains any one or any combination of the depth classification model 330 and the discriminative model 340, along with the generative model 320.

Figure 4:
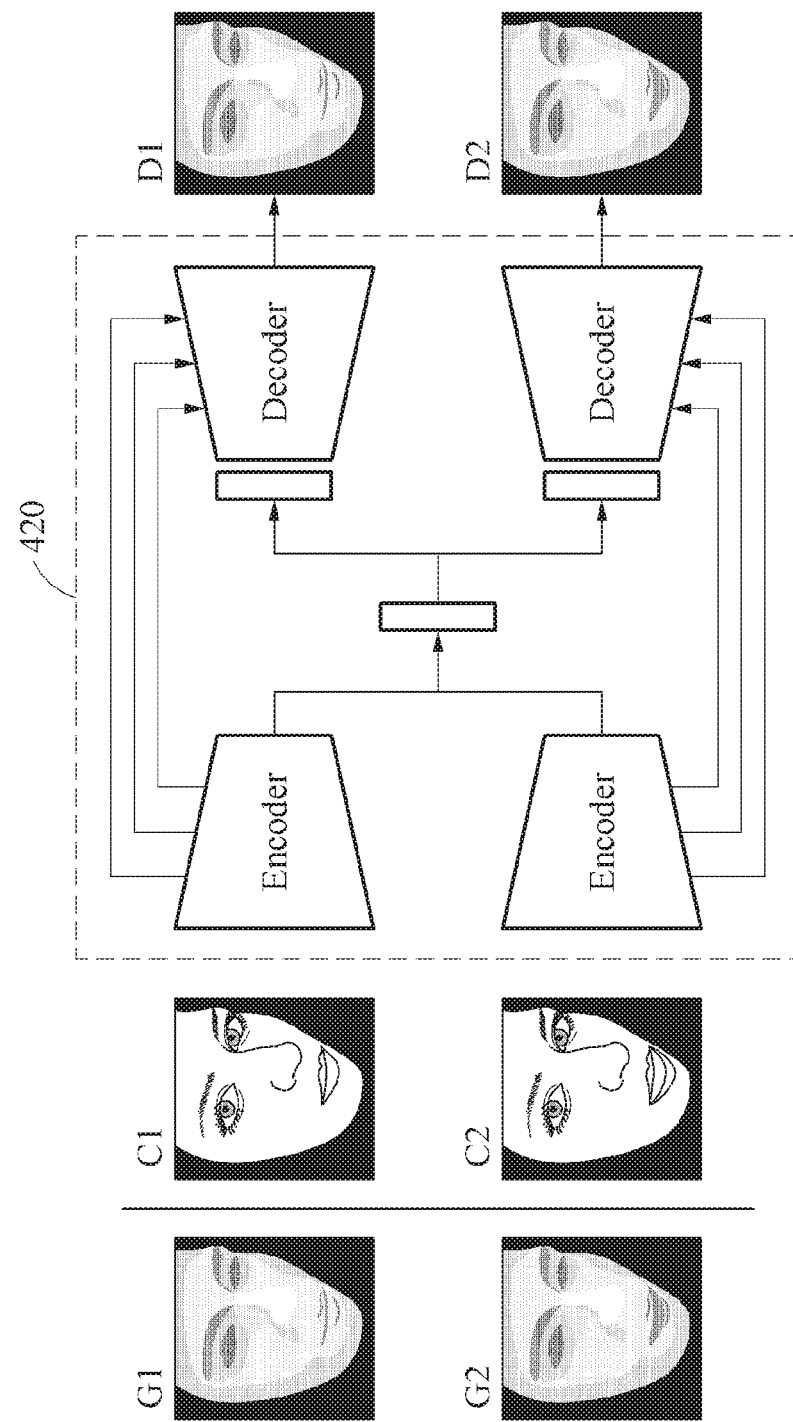
FIG. 4 illustrates an example of generating depth images from color images based on a generative model.

FIG. 4 illustrates an example of generating depth images from color images based on a generative model.

As described above, the training apparatus generates output images from input images based on a generative model 420. The training apparatus obtains training data and trains the generative model 420 based on the training data. The training data includes a pair of training inputs and a corresponding pair of training outputs. The training input may be an image of a first format, and the training output may be an image of a second format, but this is only an example. The image of the first format may be a color image, and the image of the second format may be a depth image.

Referring to FIG. 4, the training data of FIG. 4 may include an input image and a reference image. The reference image may be an image of a format that is the same format as a format of the output image. The training data may include a first color image C1 and a second color image C2 as training inputs, and a first reference image G1 and a second reference image G2 as training outputs. The first reference image G1 and the second reference image G2 are used to calculate a reconstruction loss which will be described below with reference to FIGS. 6 and 7 and an authenticity loss which will be described below with reference to FIG. 8.

The generative model 420 may include encoders and decoder. The encoders may extract more abstract features from images of the first format, and the decoders may generate images of the second format from the abstract features. As shown in FIG. 4, the training apparatus extracts a common feature from the first color image C1 and the second color image C2 based on the encoders in the generative model 420.

The training apparatus propagates, to a decoder of the generative model 420, an individual feature extracted from an encoder corresponding to the decoder along with the common feature. Thus, the training apparatus generates a depth image reflecting the individual feature while having the common feature. A first depth image D1 is an image generated based on the first color image C1, and indicates an object with an identity that is the same as the identity of a second depth image D2. The second depth image D2 is an image generated based on the second color image C2, and indicates an object with an identity the same as the identity of the first depth image D1.

Figure 5:
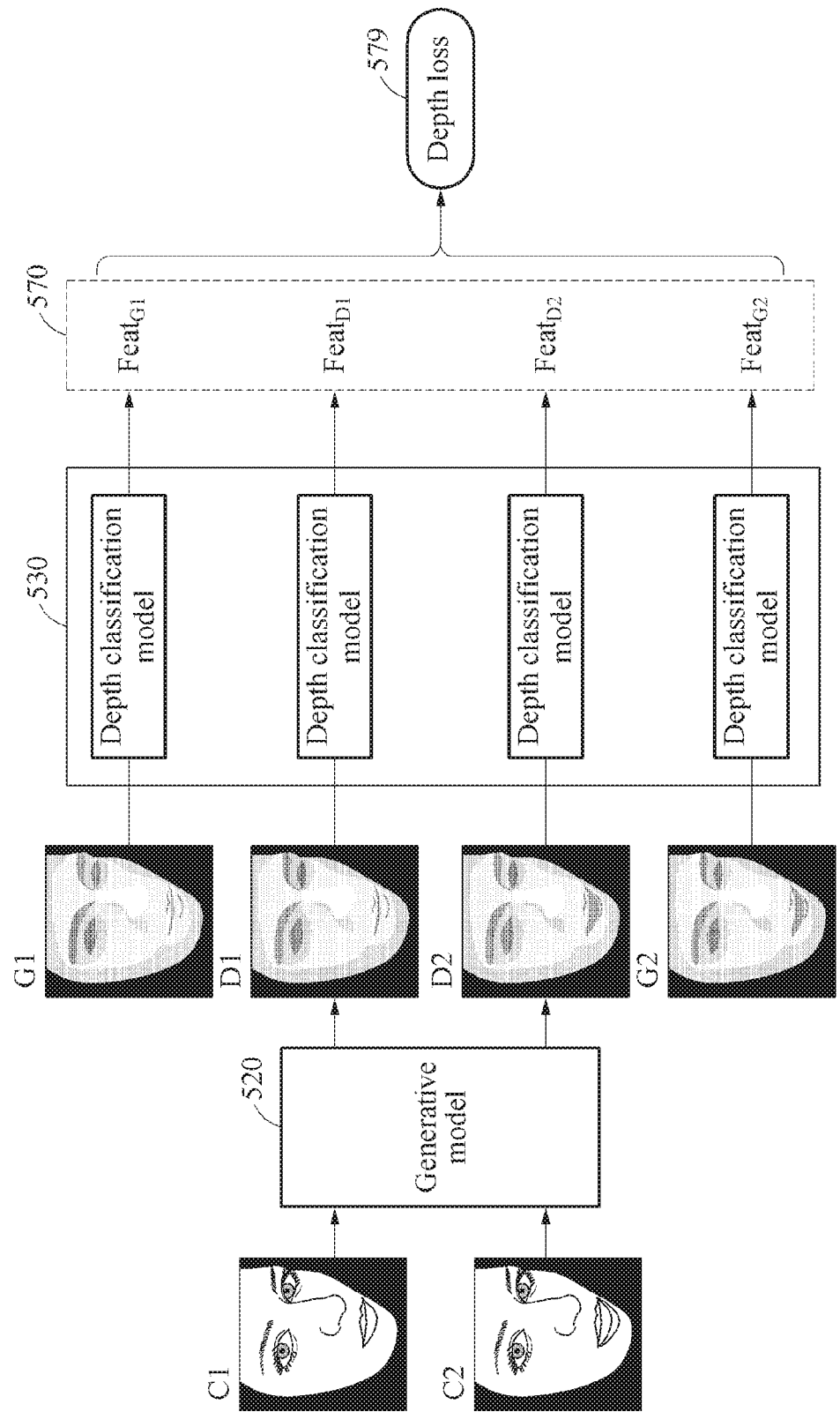
FIG. 5 illustrates an example of a depth classification model in accordance with one or more embodiments.

FIG. 5 illustrates an example of a depth classification model.

The training apparatus propagates, to a depth classification model 530, a first depth image D1 and a second depth image D2, which are respectively generated from a first color image C1 and a second color image C2 based on a generative model 520. As described above, the first depth image D1 corresponds to the first color image C1, the second depth image D2 corresponds to the second color image C2, and the first depth image D1 and the second depth image D2 may indicate objects of the same identity.

The depth classification model 530 is a model configured to extract depth features 570 from predetermined depth images. The depth classification model 530 calculates an embedding feature of a depth image. The depth classification model 530 is a model trained in advance. As shown in FIG. 5, the training apparatus calculates a first reference depth feature $Feat_{G1}$ from a first reference image G1 based on the depth classification model 530. The training apparatus calculates a first output depth feature $Feat_{D1}$ from the first depth image D1 based on the depth classification model 530. The training apparatus calculates a second reference depth feature $Feat_{G2}$ from a second reference image G2 based on the depth classification model 530. The training apparatus calculates a second output depth feature $Feat_{D2}$ from the second depth image D2 based on the depth classification model 530.

Although FIG. 5 illustrates four depth classification models 530, this is only an example, and it may not be necessary to implement four depth classification models 530 in practice. On the other hand, in an example, more than four depth classification models may be implemented. Four depth images may be input into the same depth classification model 530, and the depth classification model 530 may output corresponding depth features 570. However, examples are not limited thereto. Four depth classification models 530 having the same parameter may be implemented.

The training apparatus may implement a depth loss 579 that minimizes a distance between the depth features 570 with respect to the images that have the same identity. The training apparatus may calculate the depth loss 579 based on a similarity between at least two of depth features of output images and depth features of reference images. The training apparatus may calculate various depth losses 579, as expressed by the below Equation 1 through Equation 5 below.

$$\text{Cos Similarity}(Feat_{D1}, Feat_{D2}) \qquad \text{Equation 1:}$$

$$\text{Cos Similarity}(Feat_{D1}, Feat_{G1}) \qquad \text{Equation 2:}$$

$$\text{Cos Similarity}(Feat_{D1}, Feat_{G2}) \qquad \text{Equation 3:}$$

$$\text{Cos Similarity}(Feat_{D2}, Feat_{G1}) \qquad \text{Equation 4:}$$

$$\text{Cos Similarity}(Feat_{D2}, Feat_{D2}) \qquad \text{Equation 5:}$$

Equation 1 indicates a cosine similarity between the first output depth feature $Feat_{D1}$ and the second output depth feature $Feat_{D2}$. Equation 2 indicates a cosine similarity between the first output depth feature $Feat_{D1}$ and the first reference depth feature $Feat_{G1}$. Equation 3 indicates a cosine similarity between the first output depth feature $Feat_{D1}$ and the second reference depth feature $Feat_{G2}$. Equation 4 indicates a cosine similarity between the second output depth feature $Feat_{D2}$ and the first reference depth feature $Feat_{G1}$. Equation 5 indicates a cosine similarity between the second output depth feature $Feat_{D2}$ and the second reference depth feature $Feat_{G2}$. The cosine similarities of Equation 1 through Equation 5 are calculated according to a cosine similarity function as expressed by Equation 6.

$$CosSimilarity(A, B) = \frac{A \cdot B}{\|A\|\|B\|} \qquad \text{Equation 6:}$$

In Equation 6, "A" and "B" are each a feature vector corresponding to a depth feature, which is one of the first output depth feature $Feat_{D1}$, the second output depth feature $Feat_{D2}$, the first reference depth feature $Feat_{G1}$, and the second reference depth feature $Feat_{G2}$. Instead of the cosine similarity, a cosine distance is used as expressed by Equation 7.

$$\text{Cos Distance}(A,B) = 1 - \text{Cos Similarity}(A,B) \qquad \text{Equation 7:}$$

In this example, the training apparatus may calculate the depth loss 579 based on any two or any combination of the first output depth feature $Feat_{D1}$, the second output depth feature $Feat_{D2}$, the first reference depth feature $Feat_{G1}$, and the second reference depth feature $Feat_{G2}$. The training apparatus may update a parameter of the generative model 520 such that a cosine similarity between two depth features, for example, one pair of Equation 1 through Equation 5, converges to a threshold value, for example, "1".

Although the cosine similarity and the cosine distance are described as the loss function, examples are not limited thereto. Other functions such as a Euclidean distance may be implemented as well.

Figure 6:
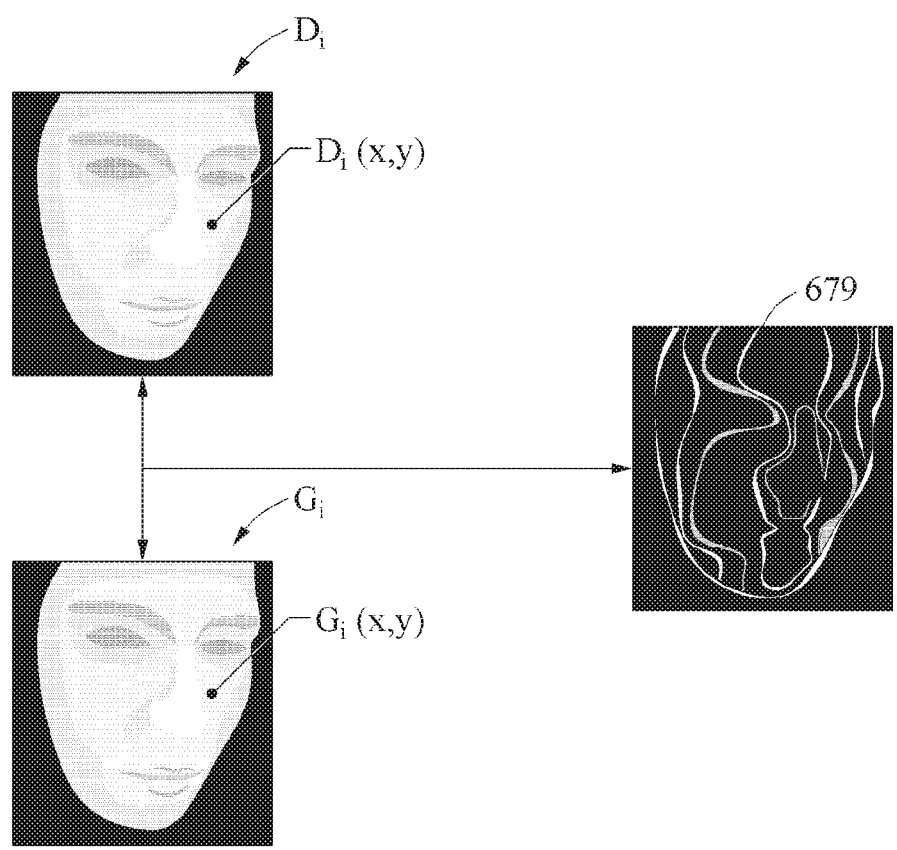
FIGS. 6 and 7 illustrate an example of a reconstruction loss in accordance with one or more embodiments.
Figure 7:
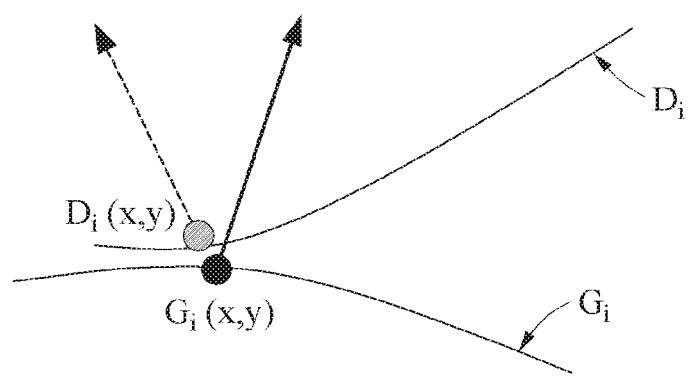

FIGS. 6 and 7 illustrate an example of a reconstruction loss.

The training apparatus calculates a reconstruction loss using various schemes.

In an example of FIG. 6, the training apparatus may calculate the reconstruction loss based on a pixel error between an output image and a reference image. The training apparatus may calculate a loss L1 as the pixel error, as expressed by example Equation 8 below.

$$|D_i - G_i|_1 \qquad \text{Equation 8:}$$

In Equation 8, $D_i$ denotes an i-th depth image, and $G_i$ denotes an i-th reference image. In an example, i denotes an integer greater than or equal to "1". In the example of FIG. 5, there are two input images, and thus i is "1" and "2". The training apparatus may calculate the loss L1 of Equation 8 by calculating an error between a pixel value of each pixel of the i-th depth image and a pixel value of a corresponding pixel of the i-th reference image. The training apparatus may calculate a pixel error between a pixel value $D_i(x,y)$ on (x, y) coordinates of the i-th depth image and a pixel value $G_i(x,y)$ on (x, y) coordinates of the i-th reference image. The training apparatus may generate a pixel error image 679 by calculating pixel errors with respect to all pixels. The pixel error image 679 may be used as the reconstruction loss.

However, the reconstruction loss is not limited to the pixel error. The training apparatus calculates a curvature from a depth image and utilizes the curvature as the reconstruction loss.

In an example of FIG. 7, the training apparatus calculates the reconstruction loss based on an error between a normal vector of each point in an output image and a normal vector of a corresponding point in a reference image. FIG. 7 illustrates a normal vector at (x,y) coordinates and a surface in the i-th depth image $D_i$, and a normal vector at (x,y) coordinates and a surface in the i-th reference image $G_i$. The training apparatus calculates a loss with respect to a surface normal vector as expressed by example Equation 9 below.

$$\text{Cos Similarity}(Normal(D_i(x,y)), Normal(G_i(x,y))) \qquad \text{Equation 9:}$$

In Equation 9, $Normal(D_i(x,y))$ denotes the normal vector of (x,y) coordinates in the i-th depth image $D_i$. $Normal(G_i(x,y))$ denotes the normal vector of (x,y) coordinates in the i-th reference image $G_i$. Cos Similarity( ) denotes a cosine similarity between the normal vectors of (x,y) coordinates of the two images. The cosine similarity is calculated, for example, as expressed by Equation 6. Thus, the training apparatus may use a similarity between normal vectors at coordinates in the output image and the reference image as the reconstruction loss.

In another example, the training apparatus may calculate the reconstruction loss based on a curvature as expressed by example Equation 10 below.

$$Loss_{L1\_curv} + \|I_{curv} - I_{curv\_gt}\|. \qquad \text{Equation 10:}$$

In Equation 10, $I_{curv}$ denotes a curvature of the output image. $I_{curv\_gt}$ denotes a curvature of the reference image.

The training apparatus defines an overall loss such that the reconstruction loss according to Equation 8 or Equation 9 converges to a threshold value. The training apparatus updates the parameter of the generative model 520 such that a cosine similarity between the output image and the reference image according to Equation 9 converges to a threshold value, for example, "1". Thus, the training apparatus may maximize a similarity between the generated depth image and the reference image.

Although FIGS. 6 and 7 principally describe the loss L1, examples are not limited thereto. Various loss functions such as a loss L2 may be used as well.

Figure 8:
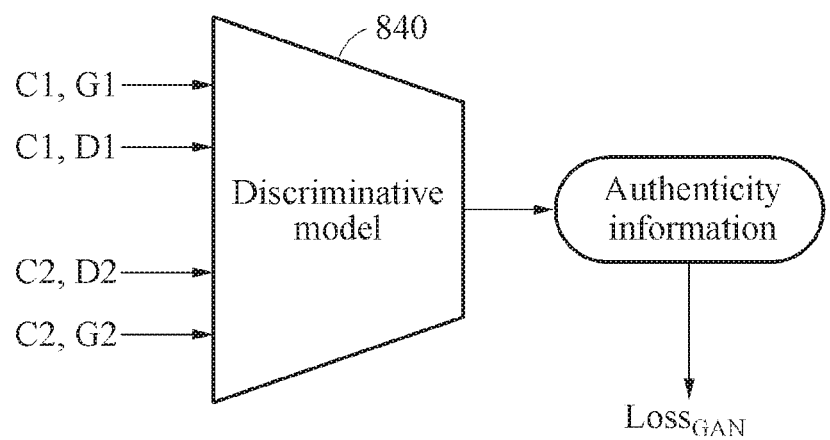
FIG. 8 illustrates an example of a discriminative model in accordance with one or more embodiments.

FIG. 8 illustrates an example of a discriminative model.

The training apparatus may calculate authenticity information based on a discriminative model 840. In the examples of FIGS. 1 through 7, the generative model may generate a delicate fake image, and the discriminative model 840 of FIG. 8 determines whether the corresponding image is authentic. The generative model may be trained to generate more realistic images, and the discriminative model 840 is trained to more accurately distinguish fake images.

The training apparatus may train the discriminative model 840 while maintaining a parameter of the generative model. The training apparatus may calculate an authenticity loss $\text{Loss}_{Gan}$ as expressed by example Equation 11 below.

$$\text{Loss}_{GAN} = \log(D_{out}(C1,G1)) + \log(D_{out}(C2,G2)) + \log(1-D_{out}(D1,G1)) + \log(1-D_{out}(D2,G2))$$ Equation 11:

In Equation 11, $D_{out}(C1, G1)$ denotes an output of the discriminative model 840 with respect to a first color image and a first reference image, $D_{out}(C2, G2)$ denotes an output of the discriminative model 840 with respect to a second color image and a second reference image, $D_{out}(D1, G1)$ denotes an output of the discriminative model 840 with respect to a first depth image and the first reference image, and $D_{out}(D2, G2)$ denotes an output of the discriminative model 840 with respect to a second depth image and the second reference image. An output of the discriminative model 840 is also referred to as authenticity information. The authenticity information is a probability indicating whether an image represents a real object, wherein "0" indicates that the image is fake, and "1" indicates that the image is authentic.

In an example, the training apparatus may train the discriminative model 840 to output "1" as a value of the authenticity information according to Equation 11 when a color image and a reference image are input into the discriminative model 840. Thus, the training apparatus trains the discriminative model 840 to output "truth" with respect to the reference image. Further, the training apparatus may train the discriminative model 840 to output "0" as the value of the authenticity information when a color image and a newly generated depth image are input into the discriminative model 840. Thus, the training apparatus may train the discriminative model 840 to output "false" with respect to the depth image. Through such training, the discriminative model 840 is trained to more delicately determine whether an object is authentic.

The training apparatus trains the generative model while maintaining the parameter of the discriminative model 840. The training apparatus trains the generative model such that the discriminative model 840 outputs "1" as the authenticity information, with respect to an output image generated from an input image based on the generative model.

Thus, the training apparatus trains the discriminative model 840 and the generative model alternately as described above.

Figure 9:
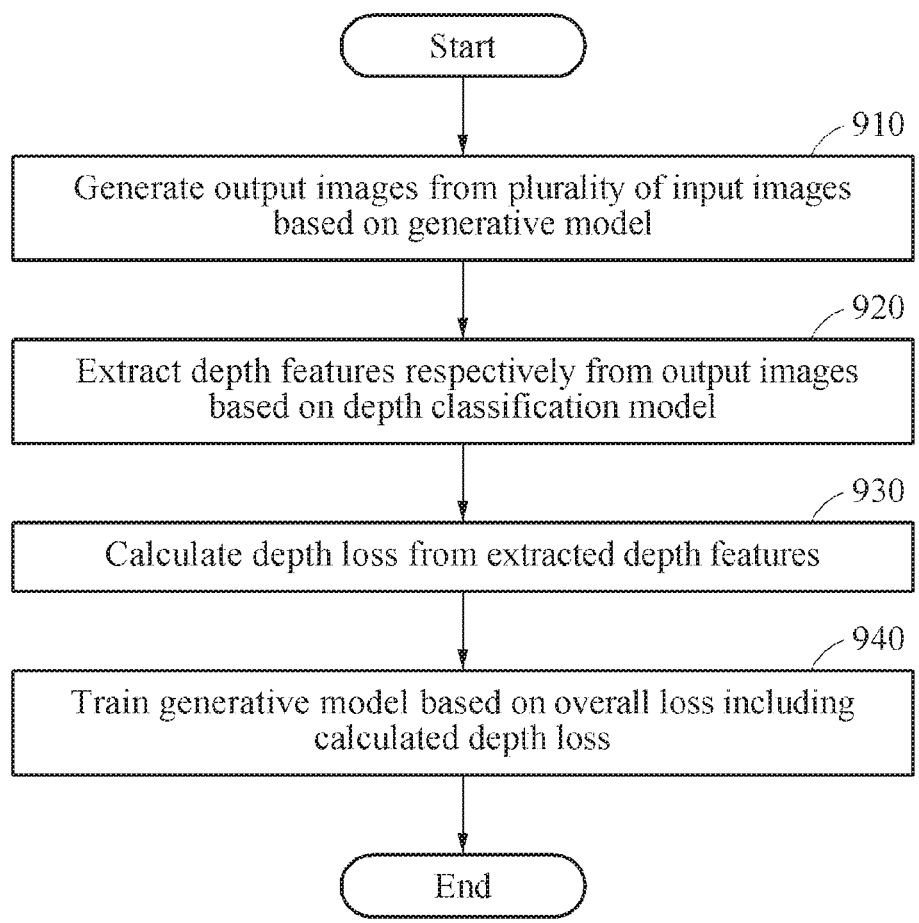
FIGS. 9 and 10 illustrate an example of a method of training a generative model in accordance with one or more embodiments.
Figure 10:
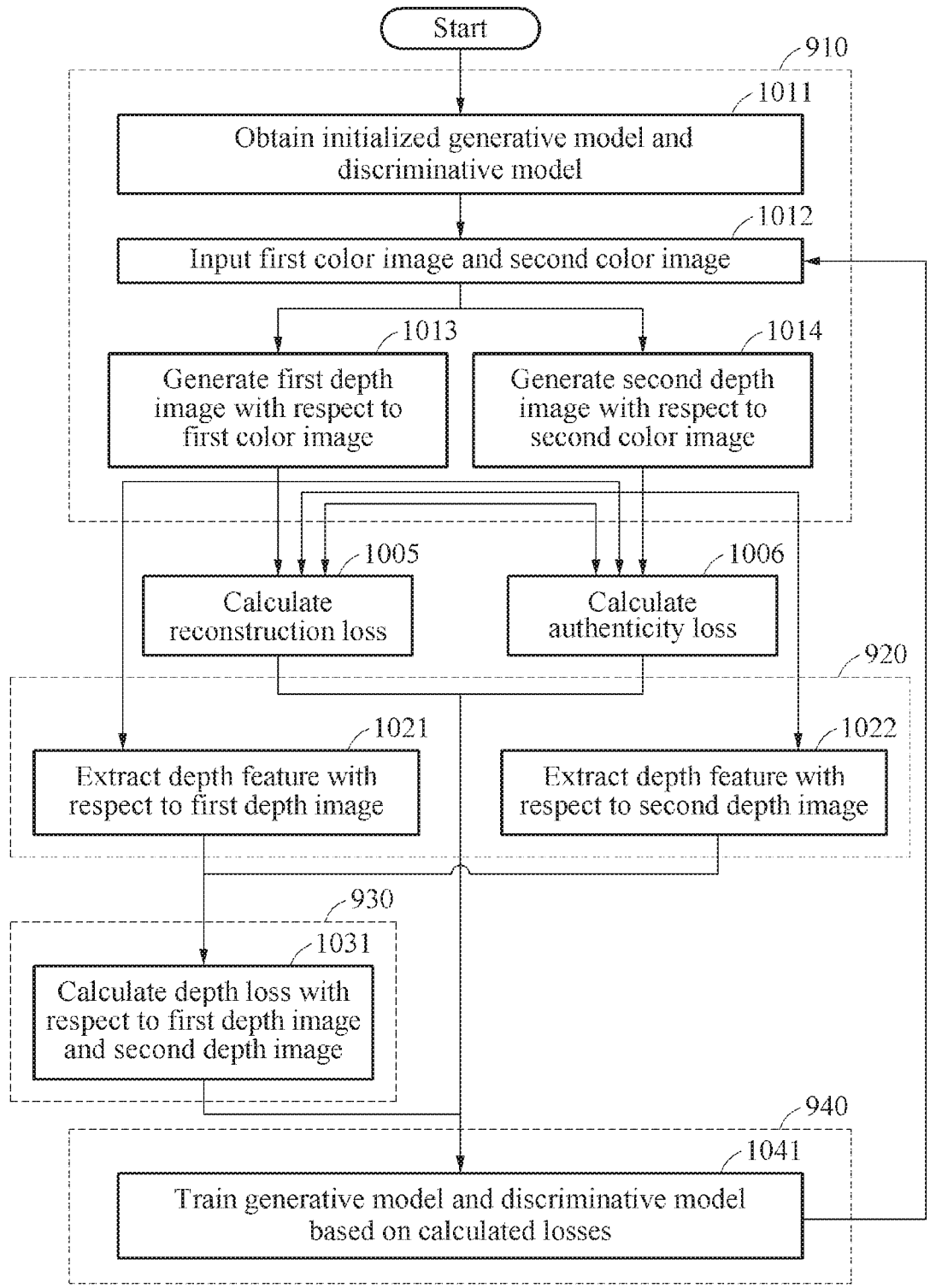

FIGS. 9 and 10 illustrate an example of a method of training a generative model. The operations in FIGS. 9 and 10 may be performed in the sequence and manner as shown, although the order of some operations may be changed or some of the operations omitted without departing from the spirit and scope of the illustrative examples described. Many of the operations shown in FIGS. 9 and 10 may be performed in parallel or concurrently. One or more blocks of FIGS. 9 and 10, and combinations of the blocks, can be implemented by special purpose hardware-based computer that perform the specified functions, or combinations of special purpose hardware and computer instructions. In addition to the description of FIGS. 9 and 10 below, the descriptions of FIGS. 1-8 are also applicable to FIGS. 9 and 10, and are incorporated herein by reference. Thus, the above description may not be repeated here.

Referring to FIG. 9, in operation 910, the training apparatus may generate output images from a plurality of input images based on a generative model.

Referring to FIG. 10, a more detailed description of operation 910 of FIG. 9 is illustrated. In operation 1011, the training apparatus may obtain an initialized generative model and an initialized discriminative model. In operation 1012, the training apparatus receives a first color image and a second color image. In operation 1013, the training apparatus generates a first depth image with respect to the first color image. In operation 1014, the training apparatus generates a second depth image with respect to the second color image. The training apparatus respectively generates the first depth image and the second depth image from the first color image and the second color image based on the generative model.

In operation 1005, the training apparatus calculates a reconstruction loss. An example of calculating the reconstruction loss is as described above with reference to FIGS. 6 and 7. In operation 1006, the training apparatus calculates an authenticity loss. An example of calculating the authenticity loss is as described above with reference to FIG. 8.

Referring again to FIG. 9, in operation 920, the training apparatus extracts depth features respectively from the output images based on a depth classification model.

Referring again to FIG. 10, a more detailed description of operation 920 of FIG. 9 is illustrated. In operation 1021, the training apparatus extracts a depth feature with respect to the first depth image. In operation 1022, the training apparatus extracts a depth feature with respect to the second depth image.

Referring again to FIG. 9, in operation 930, the training apparatus calculates a depth loss from the extracted depth features.

Referring again to FIG. 10, a more detailed description of operation 930 of FIG. 9 is illustrated. In operation 1031, the training apparatus calculates a depth loss with respect to the first depth image and the second depth image.

Referring again to FIG. 9, in operation 940, the training apparatus trains the generative model based on an overall loss including the calculated depth loss. The training apparatus trains the generative model and the discriminative model based on the calculated depth loss. As described above, the training apparatus trains the generative model and the discriminative model alternately. The training apparatus updates a parameter of the generative model so as to minimize the overall loss.

Figure 11:
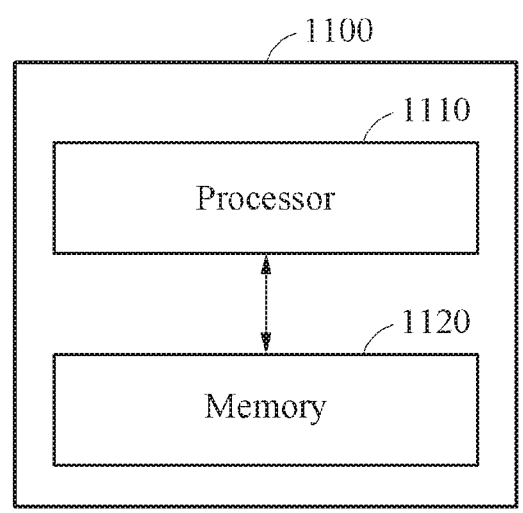
FIG. 11 illustrates an example of a configuration of an apparatus in accordance with one or more embodiments.

FIG. 11 illustrates an example of a configuration of an apparatus.

Referring to FIG. 11, an apparatus 1100 may be implemented as a training apparatus or an image generating apparatus. The apparatus 1100 includes a processor 1110 and a memory 1120. The processor 1110 performs any one, any combination, or all operations or methods described with reference to FIGS. 1 through 10, or an algorithm corresponding to the at least one method. The processor 1110 executes a program and controls the apparatus 1100. The computer instructions or code executed by the processor 1110 care stored in the memory 1120.

When the apparatus 1100 is implemented as a training apparatus, the processor 1110 of the training apparatus generates output images from a plurality of input images based on a generative model. The processor 1110 extracts depth features respectively from the output images based on a depth classification model. The processor 1110 calculates a depth loss from the extracted depth features. The processor 1110 trains the generative model based on an overall loss including the calculated depth loss. However, the operation of the processor 1110 is not limited thereto. The processor 1110 may perform a combination of the operations described with reference to FIGS. 1 through 10.

The memory 1120 stores the generative model and a parameter of the generative model. The memory 1120 further stores the depth classification model. The memory 1120 stores instructions to perform the operations described with reference to FIGS. 1 through 10.

When the apparatus 1100 is implemented as an image generating apparatus, the processor 1110 of the image generating apparatus 1100 obtains a parameter to output a depth image in which an object sameness is preserved, with respect to an image generative model. The processor 1110 generates a depth image corresponding to each two-dimensional (2D) image from a plurality of 2D images based on the image generative model to which the parameter is applied. The processor 1110 generates a depth image including an object with an identity the same as the identity of an object included in each 2D image, based on the image generative model. The apparatus 1100 may acquire the 2D image through an image sensor. The processor 1110 may select at least two 2D images from a plurality of frame images, in response to acquisition of the plurality of frame images. The processor 1110 generates depth images respectively corresponding to the selected at least two 2D images. Further, the processor 1110 may acquire any one or any combination of an infrared image and a color image as the 2D image through the image sensor.

The processor 1110 generates a depth image corresponding to a 2D image, in response to acquisition of the 2D image. The processor 1110 authenticates a user whose image is captured in the 2D image by determining whether the user is an enrolled user based on the depth image. The processor 1110 authenticates the user based on additional recognition results and a result of matching an enrolled user stored in an enrollment database and the depth image. The processor 1110 calculates a matching result, for example, a similarity, between depth feature data extracted from the depth image, for example, a feature vector indicating a visual feature extracted through a neural network, and enrolled feature data corresponding to an enrolled user in the enrollment database. The processor 1110 determines that an authentication is successful, in response to the similarity exceeding a threshold similarity. Furthermore, the processor 1110 uses, as the additional recognition results, a matching result between a color image and an enrolled image, a matching result between an input pupil image and an enrolled pupil image, a matching result between an infrared image and an enrolled image, a matching result between an input iris image and an enrolled iris image, and other biometric authentication results. The processor 1110 determines whether authentication with respect to the user is finally successful based on the additional recognition results and the recognition result based on the depth image.

The processor 1110 may unlock a device, in response to the authentication with respect to the user being successful. The processor 1110 allows an access to at least a portion of applications stored in the device based on an authority set for an enrolled user determined to match the user. The device runs an application that the enrolled user is allowed to access, in response to a user input.

The memory 1120 stores the image generative model and a parameter corresponding to the image generative model. The parameter corresponding to the image generative model is a parameter such as a connection weight trained through the operations described with reference to FIGS. 1 through 10.

The image generative model is trained to preserve an identity of an individual object or user represented in each color image. The training apparatus 1100 trains the image generative model based on images indicating objects or users of the same identity. The training apparatus generates output images indicating the objects or users of the same identity from the images indicating the objects or users of the same identity based on the image generative model. Such an image generative model is utilized for 3D face recognition, training DB augmentation for 3D face recognition, face depth noise removal, and a personalized 3D face model, for example, a 3D avatar or augmented reality (AR) emoji.

The image generating apparatus 1100 augments a huge 3D face dataset from a 2D face dataset published in the past, without using an expensive laser scanner. A new output image set generated from an input image set indicating objects of the same identity also indicates the objects of the same identity. Even when the input image set includes facial images of various facial expressions, the image generating apparatus 1100 generates output images such that output images respectively corresponding to the facial expressions indicate objects of the same identity. Thus, the image generating apparatus 1100 greatly improves the likelihood that output images generated based on the image generative model indicate the same object. The training apparatus 1100 generates and trains such an image generative model. The training apparatus 1100 forces training of the image generative model to generate output images of the same object, by introducing the depth classification model.

The image generating apparatus, the training apparatus, the processor 1110, the memory 1120, and other apparatuses, components, devices, and other components described herein with respect to FIGS. 1-11 are, and are implemented by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated and discussed with respect to FIGS. 1-11, and that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers r, such as machine code produced by a compiler. In another example, the instructions or software includes higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, as non-limiting blue-ray or optical disk storage examples, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of training a generative model, the method comprising:
generating output images from a plurality of input images based on the generative model;
extracting depth features from the respective output images based on a depth classification model;

calculating a depth loss between the extracted depth features; and training the generative model based on an overall loss that includes the calculated depth loss.

2. The method of claim 1, wherein the training of the generative model comprises updating a parameter of the generative model to minimize the calculated depth loss.

3. The method of claim 1, wherein the calculating of the depth loss comprises calculating a reconstruction loss between an output image generated from each of the plurality of input images and a reference image mapped to a corresponding input image, with respect to the output image, and the training of the generative model comprises training the generative model based on a loss calculated from the depth loss and the reconstruction loss.

4. The method of claim 3, wherein the calculating of the reconstruction loss comprises calculating the reconstruction loss based on a pixel error between the output image generated from each of the plurality of input images and the reference image.

5. The method of claim 3, wherein the calculating of the reconstruction loss comprises calculating the reconstruction loss based on an error between a normal vector of each point in the output image generated from each of the plurality of input images and a normal vector of a corresponding point in the reference image.

6. The method of claim 1, further comprising:

calculating authenticity information from the input images, the output images, and reference images based on a discriminative model, wherein the calculating of the depth loss comprises calculating an authenticity loss based on the authenticity information and a reference value, and the training of the generative model comprises training any one or any combination of the generative model and the discriminative model based on the authenticity loss.

7. The method of claim 6, wherein the training of the generative model comprises training the discriminative model while maintaining a parameter of the generative model.

8. The method of claim 6, wherein the training of the generative model comprises training the generative model while maintaining a parameter of the discriminative model.

9. The method of claim 1, wherein the generating of the output images comprises acquiring color images as the input images and generating depth images as the output images.

10. The method of claim 1, wherein the calculating of the depth loss comprises calculating the depth loss based on a similarity between at least two of depth features of reference images and depth features of the output images.

11. A non-transitory computer-readable storage medium storing instructions that, when executed by a processor, cause the processor to perform the method of claim 1.

* * * * *